United States Patent [19]

Holman et al.

[11] Patent Number: 4,534,987
[45] Date of Patent: * Aug. 13, 1985

[54] METHOD OF CONVECTION COOKING OF FOOD

[76] Inventors: J. Harrison Holman, 340 Promenade East, #223, Portland, Me. 04101; Jay C. Holman, 1 Orchard Hill Rd., Scarborough, Me. 04074

[*] Notice: The portion of the term of this patent subsequent to Aug. 14, 2001 has been disclaimed.

[21] Appl. No.: 632,437

[22] Filed: Jul. 19, 1984

Related U.S. Application Data

[60] Continuation of Ser. No. 498,528, May 26, 1983, Pat. No. 4,465,701, which is a division of Ser. No. 233,912, Feb. 12, 1981, Pat. No. 4,386,558.

[51] Int. Cl.³ .................................................. A23L 1/00
[52] U.S. Cl. ..................................... 426/523; 426/520
[58] Field of Search ................. 426/523, 520; 99/386, 99/401, 447; 126/21 A; 219/400, 460, 531

[56] References Cited

U.S. PATENT DOCUMENTS 3,485,229  12/1969  Gilliom ............................. 219/400
3,783,219  1/1974   Tateda ............................. 219/400

Primary Examiner—George Yeung
Attorney, Agent, or Firm—William Nitkin

[57] ABSTRACT

Disclosed is a commercial convection cooking equipment having an outer casing and inner food cooking chamber forming channel(s) therebetween with air intake vent and fan to force air through such channel(s) to cool portions of the outer casing and then when such air is heated, to redirect the hot air back into the food cooking chamber.

2 Claims, 3 Drawing Figures

METHOD OF CONVECTION COOKING OF FOOD

This application is a continuation of our prior application of the same name, Ser. No. 498,528 filed 5/26/83, now U.S. Pat. No. 4,465,701, which application was a divisional application of our earlier filed application of the same title, Ser. No. 233,912 filed 02/12/81, now U.S. Pat. No. 4,386,558.

BACKGROUND OF THE INVENTION

1. Field of the Invention

The equipment of this invention resides in the area of cooking devices and more particularly relates to commercial convection cooking equipment incorporating an internal air flow system designed to cool outside surfaces of the unit and to redirect the subsequently heated air back into the cooking area.

2. History of the Prior Art

Commercial cooking equipment usually provides heating elements within an area and food movement means or placement means in the vicinity of the heating elements to cause the cooking of the food thereupon. Fans directing cool air from outside the unit direct such air against selected electrical parts to avoid their overheating. Forced convection ovens are also well known which usually include a fan within the cooking chamber to move the heated air around the food. This process speeds up the cooking process. Some commercial cooking equipment becomes extremely hot on its outside surface and is dangerous to touch.

SUMMARY OF THE INVENTION

It is an object of this invention to provide an improved cooking equipment having an air movement means designed both to cool the outer casing of the equipment along with other working elements of the unit and to redirect the then heated air back into the food cooking area. It is desirable to cool the exterior of commercial cooking equipment which frequently reaches extremely high temperatures and is dangerous to touch. The air used for such cooling process instead of being vented to the exterior, is then redirected back into the food cooking area so as to add heat that would have been otherwise wasted thereby effectively increasing the energy utilization efficiency of the cooking unit in comparison with conventional commercial cooking equipment.

DESCRIPTION OF THE PREFERRED EMBODIMENT(S)

Figure 1:
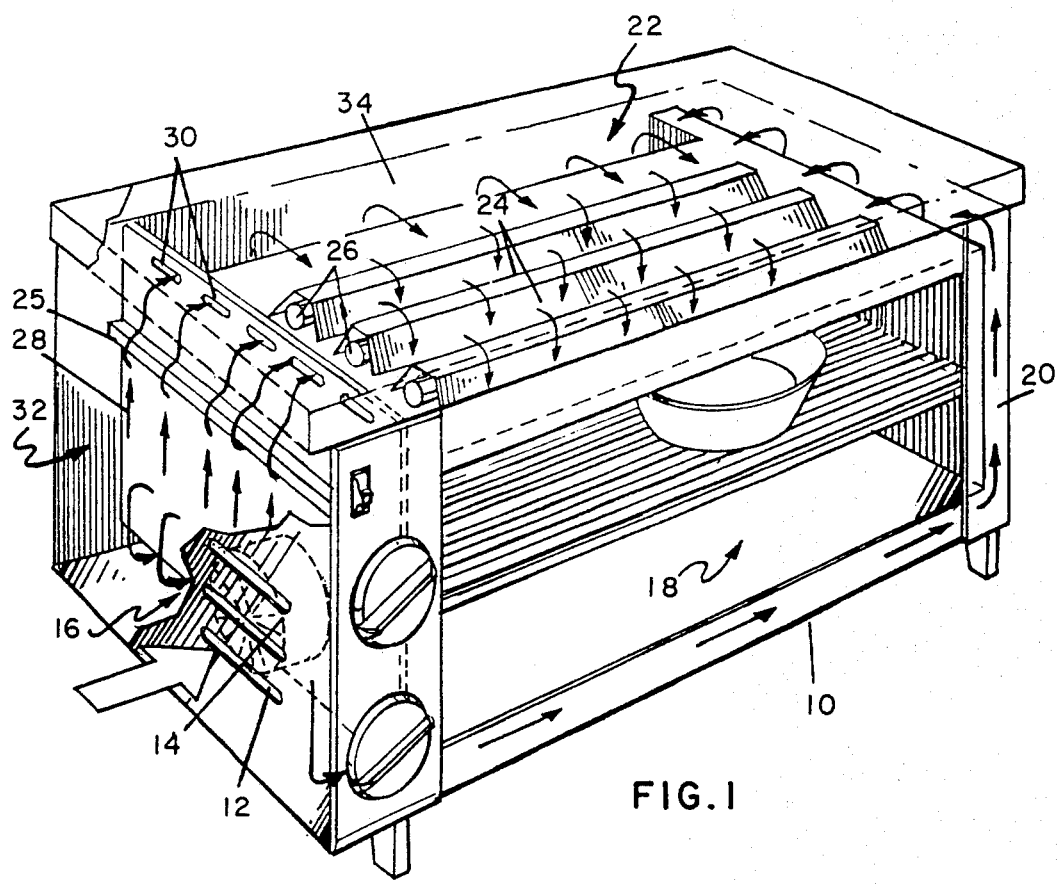
FIG. 1 illustrates a cutaway view of a finishing oven incorporating the system of this invention.

FIG. 1 is a perspective cutaway view showing air intake vent 12 of finishing oven/cheese melter 10 behind which is fan member 14 operating to force air from outside the unit through a series of channels. Fan 14 forces air coming from outside the unit through air intake vent 12 downward to a bottom channel 16 which extends under food cooking area 18 and then up side channel 20 on the opposite side of the unit and into top channel 22 where the air is redirected back through spaces 24 between heating elements 26 which can be fused quartz radiant heaters or equivalent. The air then passes into food cooking area 18. A second smaller flow 28 of air passes through apertures 30 defined at the top of the first side channel 32, encompassing the side around the air intake vent 12 and fan 14 to cool the area located above channel 32 and the adjoining side of top channel 22 of the cooking unit which the air directed along the bottom channel may not reach to sufficiently cool thereby avoiding the development of hot spots therein. The air also passes from bottom channel 16 up rear channel 34 formed in the back of the unit with such air traveling up therethrough and then across the top channel 22 and back through spaces 24 between heaters 26. The width and height of the channel correspond closely to the exterior side size which they are to cool. One must be careful not to force too much air too quickly through the channels which increased air flow would not allow the air to heat sufficiently while cooling the outside casing and which cooler air when directed into food cooking area 18 would retard the cooking process. It has been found that the fan, channel depth and baffles 25 must be adjusted so that the air as it is heated running along the bottom, side and top channels must reach at least 350° F. in most toasters and cheese melters and that a temperature of 400° F. is preferable before the air is redirected back into food cooking area 18.

Figure 2:
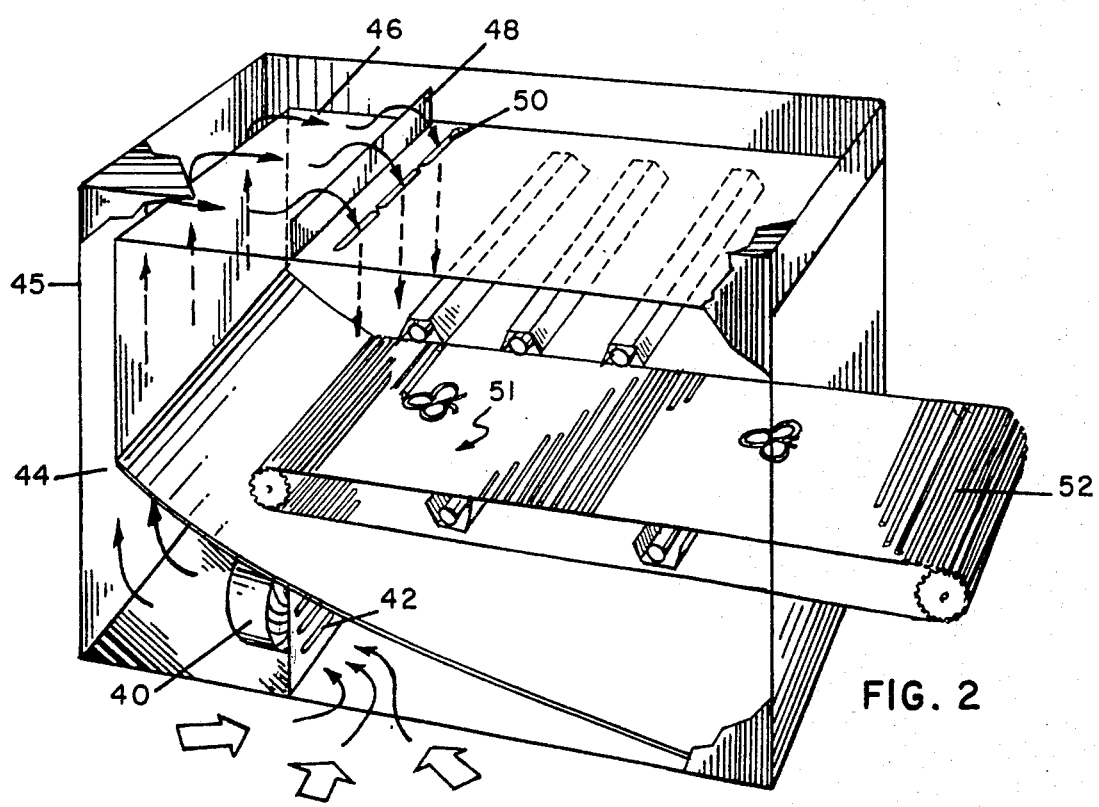
FIG. 2 illustrates the system of this invention incorporated within a conveyor pretzel baker.

FIG. 2 illustrates a second embodiment of this invention wherein the system of this invention is utilized in a conveyor pretzel baker with fan 40 blowing air, received through air intake vent 42 located on the bottom of the unit, toward the rear of the unit and up rear channel 44, the outside wall 45 of which is desirec to be cooled so that the unit can be safely placed against a wall. The air travels up rear channel 44 across top channel 46, over baffle 48 and through louver 50, into the food cooking area 51 in which the pretzels are carried by conveyor belt 52. Baffle 48 is used to slow the air circulation to cause a turbulance of air within top channel 46 which prevents too much hot air from immediately blowing down onto the pretzels which would otherwise cook the outsides faster than the insides causing the pretzels to explode due to the expanding dough within the quickly cooked outer crust. Baffle 48 has been found to function well as a ⅜ inch high strip extending along the front of louver 50. The controls of the unit can also be cooled at the same time as the rear wall 45 of the unit if they are located in the area where the fan circulates air.

Figure 3:
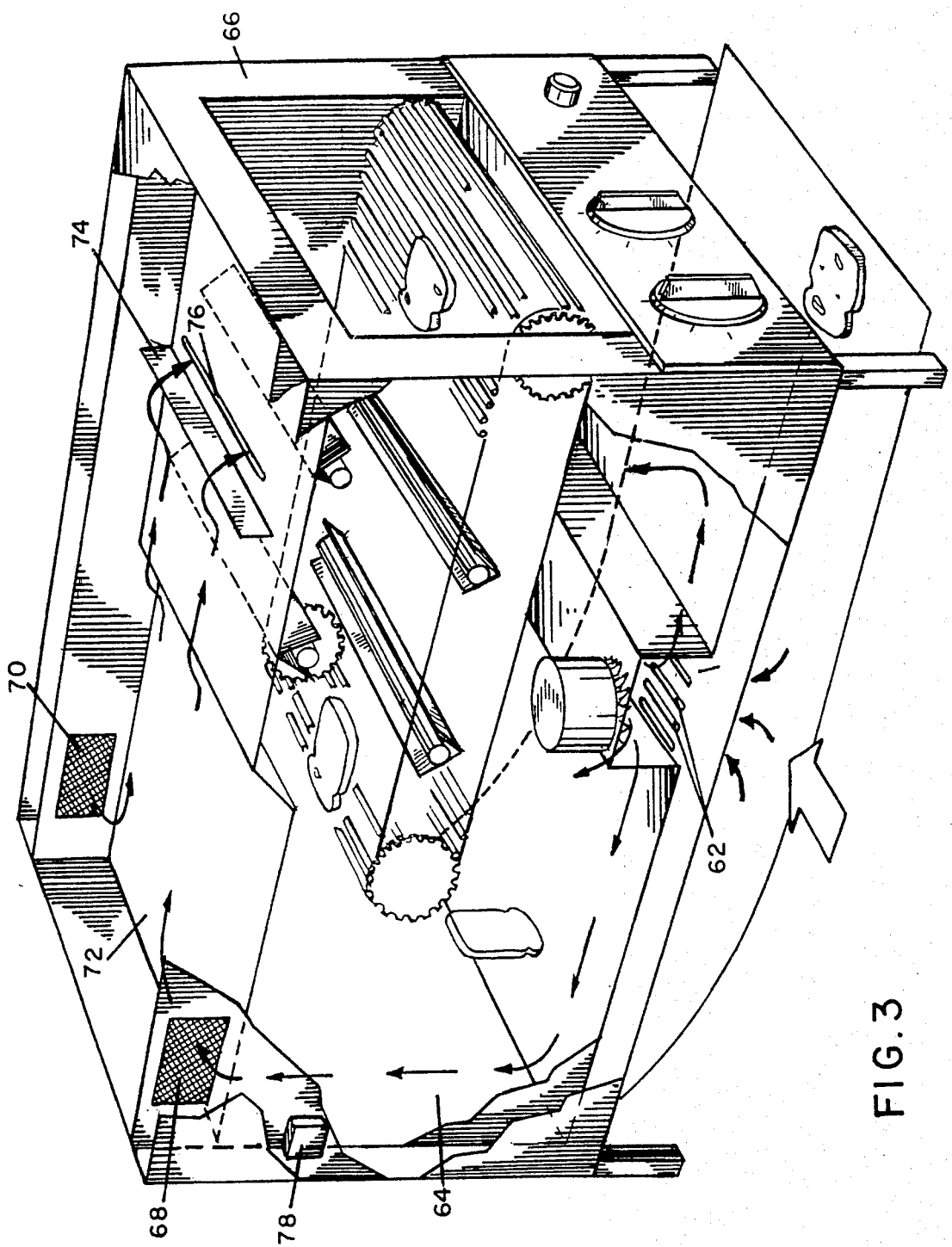
FIG. 3 illustrates the system of this invention incorporated within a conveyor toaster.

FIG. 3 illustrates the third example of the air movement system of this invention incorporated within a conveyor toaster wherein fan 60 directs air from the bottom of the unit through a transverse channel 62 out to channels 64 and 66 encompassing the sides of the unit, the outside walls of which are desired to be cooled. The air passes up through vents 68 and 70 in the inner side of side channels 64 and 66, respectively, into top channel 72, over baffle 74 and then down through vent 76 into the food cooking area. Thermostat 78 can control the operation of fan 60, for example, as illustrated in the conveyor toaster of FIG. 3. When the temperature reaches 150° F. on the inner wall of the side channel, fan 60 will turn on to cool the side walls. Also additional heat can be added to the air as it enters the food cooking area by means of auxiliary heaters if desired.

Although the present invention has been described with reference to particular embodiments, it will be apparent to those skilled in the art that variations and modifications can be substituted therefor without departing from the principles and spirit of the invention.

We claim:

1. A method of cooking comprising the steps of:

forming a food cooking unit having an outer casing with air intake vent means, an inner cooking chamber with air entry aperture means, at least one channel between said inner cooking chamber and a corresponding portion of said outer casing, and a heat source inside said inner cooking chamber for heating said inner cooking chamber;

forcing air through said outer casing air intake means into and through said channel between said outer casing and said inner cooking chamber;

cooling said outer casing around said channel by contact with said forced air;

heating said flow of forced air by contact with said heated inner cooking chamber;

directing said heated flow of forced air into said cooking chamber through said air entry aperture means allowing the heated air to assist in the cooking process; and cooking food in said food cooking unit.

2. In a method for operation of a food cooking unit including the convection cooking of food contained within a cooking chamber formed in said food cooking unit, said unit having an external casing with an ambient air intake vent disposed therein and wherein at least one channel communicates between said cooking chamber and at least portions of the casing, said channel communicating also with the interior of said cooking chamber, the unit further including a heat source disposed interiorly of said cooking chamber for heating said cooking chamber, the improvement comprising the steps of:

drawing ambient air through said air intake vent formed in the casing and into the channel between said cooking chamber and said casing to cool at least portions of said casing and to heat the air in said channel by contact with said cooking chamber; and directing the heated air from said channel into said cooking chamber to allow the heated air to assist in cooking of food within said cooking chamber.

* * * * *